(12) United States Patent
Bewley, Jr.

(10) Patent No.: US 11,993,549 B2
(45) Date of Patent: May 28, 2024

(54) SOLIDS SEPARATOR FOR A COMPOSTING SYSTEM

(71) Applicant: Haier US Appliance Solutions, Inc., Wilmington, DE (US)

(72) Inventor: Wilbur Carl Bewley, Jr., Nicholasville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 626 days.

(21) Appl. No.: 17/102,744

(22) Filed: Nov. 24, 2020

(65) Prior Publication Data
US 2022/0162135 A1  May 26, 2022

(51) Int. Cl.
| | |
|---|---|
| *B01D 33/04* | (2006.01) |
| *B01D 33/048* | (2006.01) |
| *B01D 33/46* | (2006.01) |
| *C02F 11/123* | (2019.01) |
| *C05F 17/40* | (2020.01) |
| *C05F 17/921* | (2020.01) |
| *C05F 17/986* | (2020.01) |
| *C02F 103/32* | (2006.01) |

(52) U.S. Cl.
CPC ............ *C05F 17/40* (2020.01); *B01D 33/048* (2013.01); *B01D 33/466* (2013.01); *C02F 11/123* (2013.01); *C05F 17/939* (2020.01); *C05F 17/986* (2020.01); *C02F 2103/32* (2013.01)

(58) Field of Classification Search
CPC .... B01D 33/04; B01D 33/048; B01D 33/056; B01D 33/37; B01D 33/41; B01D 33/466; B01D 33/58; B01D 33/646; B01D 33/705; B01D 33/74; B01D 33/745; B01D 33/48; C05F 17/40; C05F 17/939; C02F 11/123; C02F 11/12

USPC ....... 210/137, 400, 401, 406, 248, 391, 398, 210/770, 774, 783
See application file for complete search history.

(56) References Cited

U.S. PATENT DOCUMENTS

| | | | |
|---|---|---|---|
| 9,862,630 B2 | 1/2018 | Platts et al. | |
| 2011/0089122 A1* | 4/2011 | Smith | B01D 33/056 210/774 |

FOREIGN PATENT DOCUMENTS

| | | |
|---|---|---|
| JP | 2006/095467 A | 4/2006 |
| JP | 4328930 B2 | 9/2009 |
| KR | 101449642 B1 | 10/2014 |

OTHER PUBLICATIONS https://www.google.com/search?q=naturemill+composter&rlz=1C1GCEV_en&oq=naturemill&aqs=chrome.0.69i59j69i57j0l2j69i6l12.3699j0j8&sourceid=chrome&ie=UTF-8.
(Continued)

*Primary Examiner* — Sharon Pregler
(74) *Attorney, Agent, or Firm* — Dority & Manning, P.A.

(57) ABSTRACT

A solids separator for use in a composting system for separating solid waste from liquid waste in a stream of waste includes a housing defining a waste inlet for receiving the stream of waste, a liquids outlet for passing the liquid waste, and a solids outlet for passing the solid waste. A separator belt is positioned within the housing and extending between the liquids outlet and the solids outlet, the separator belt defining a plurality of apertures through which the liquid waste passes through the separator belt and into the liquids outlet. A drive cylinder is rotatably mounted within the housing for selectively rotating the separator belt such that a top surface of the belt is moved toward the solids outlet along with the solid waste that is extracted from the stream of waste.

20 Claims, 7 Drawing Sheets

(56) References Cited

OTHER PUBLICATIONS http://175.45.125.143/uk/domestic-composter.
https://www.whirpoolcorp.com/whirlpool-corporation-debuts-new-zera-food-recycler-on-indiegogo/.
https://youtu.be/YEzFOsXh-QQ.
https://www.youtube.com/watch?y=15JRhlaU4K8&feature=youtu.be.

* cited by examiner

US 11,993,549 B2

SOLIDS SEPARATOR FOR A COMPOSTING SYSTEM

FIELD OF THE INVENTION

The present subject matter relates generally to waste management systems, and more particularly to a solids separator for removing solid waste from a stream of waste to facilitate a composting process.

BACKGROUND OF THE INVENTION

Landfills are commonly used sites for disposing of waste materials or garbage generated by humans. For example, trash collection systems typically collect waste from residential and commercial locations and transport that waste to landfills, where it is dumped and covered with dirt. Notably, food waste that is collected and deposited in a landfill undergoes an anaerobic decomposition process due to the lack of oxygen and can thus produce methane. Removing this food waste from the waste materials dumped in a landfill may significantly reduce the generation of methane, which is a very harmful greenhouse gas that is not environmentally friendly and may lead to global warming.

Moreover, food waste may be composted to provide useful soil and fertilizer for improved plant growth. In addition, composting produces carbon dioxide and water in an aerobic process due to the presence of oxygen, as opposed to relatively harmful methane. However, conventional composting systems are burdensome and inefficient. For example, food must be properly separated, collected, and removed from the home frequently to reduce smells in the house and facilitate the composting process. Moreover, the solid waste must typically be separated from the liquid waste, and current systems for extracting solid waste are ineffective and may generate undesirable smells.

Accordingly, an improved waste management system for facilitating disposal of food waste is desired. More specifically, a waste or solids separator that efficiently separates solid waste from liquid waste to facilitate reduced methane generation in landfills would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a solids separator for separating solid waste from liquid waste in a stream of waste is provided. The solids separator includes a housing defining a waste inlet for receiving the stream of waste, a liquids outlet for passing the liquid waste, and a solids outlet for passing the solid waste. A separator belt is positioned within the housing and extending between the liquids outlet and the solids outlet, the separator belt defining a plurality of apertures through which the liquid waste passes through the separator belt and into the liquids outlet. A drive cylinder is rotatably mounted within the housing and is selectively rotated to drive the separator belt such that a top surface of the belt is moved toward the solids outlet along with the solid waste that is extracted from the stream of waste.

In another exemplary embodiment, a composting system for separating solid waste from liquid waste in a stream of waste passing through a sink drain is provided. The composting system includes a P-trap fluidly coupled to the sink drain downstream of the sink drain, a solids separator fluidly coupled to the P-trap downstream of the P-trap, the solids separator defining a liquids outlet for passing the liquid waste and a solids outlet for passing the solid waste, and a composting bin fluidly coupled to the solids outlet, the composting bin defining a mixing chamber for receiving the solid waste.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
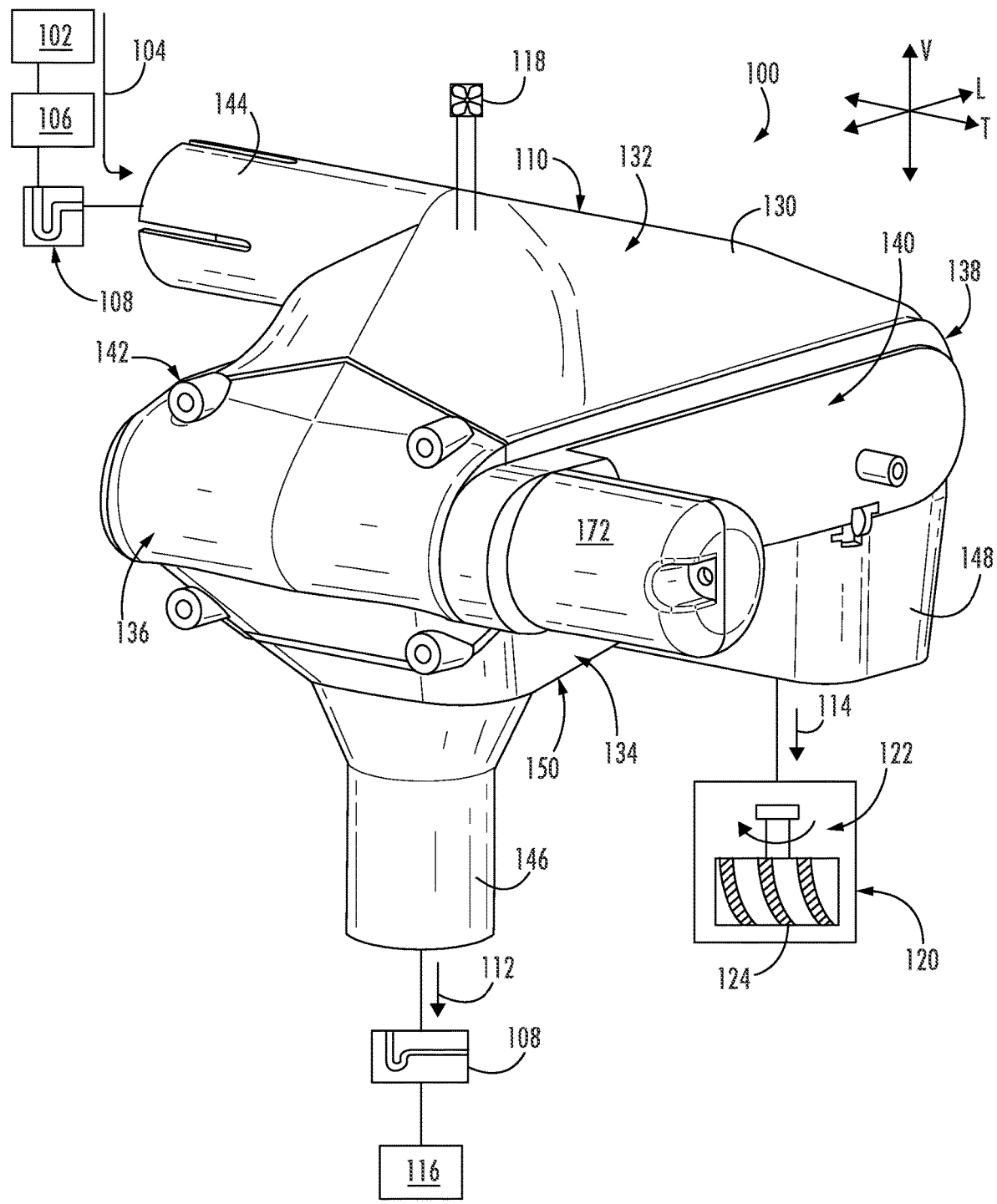
FIG. 1 provides a schematic view of a waste management or composting system, along with a perspective view of a solids separator that may be used to separate solid waste from liquid waste within such a system according to an exemplary embodiment of the present subject matter.
Figure 2:
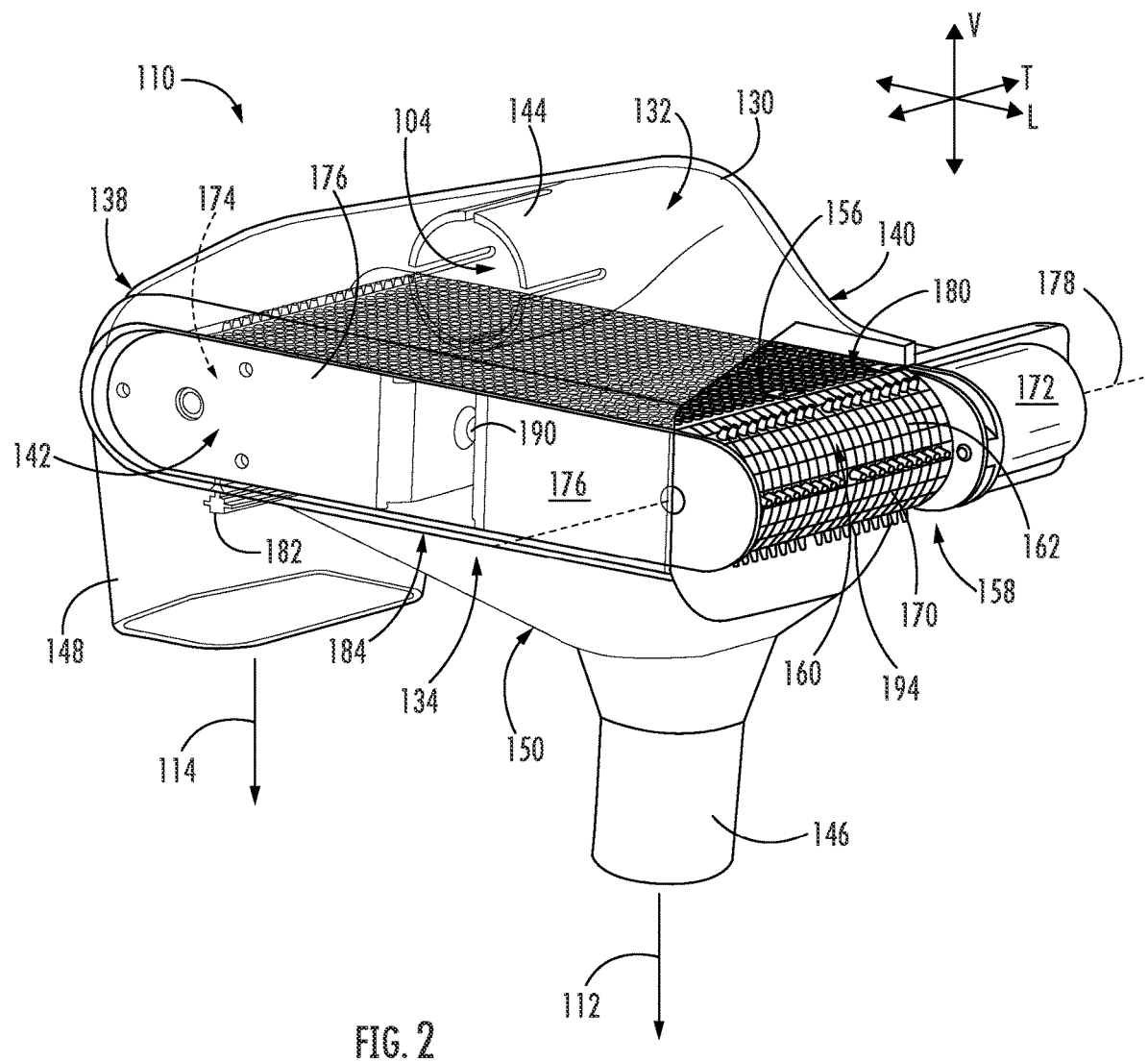
FIG. 2 provides a perspective view of the exemplary solids separator of FIG. 1 with a housing illustrated in phantom according to example embodiments of the present subject matter.
Figure 3:
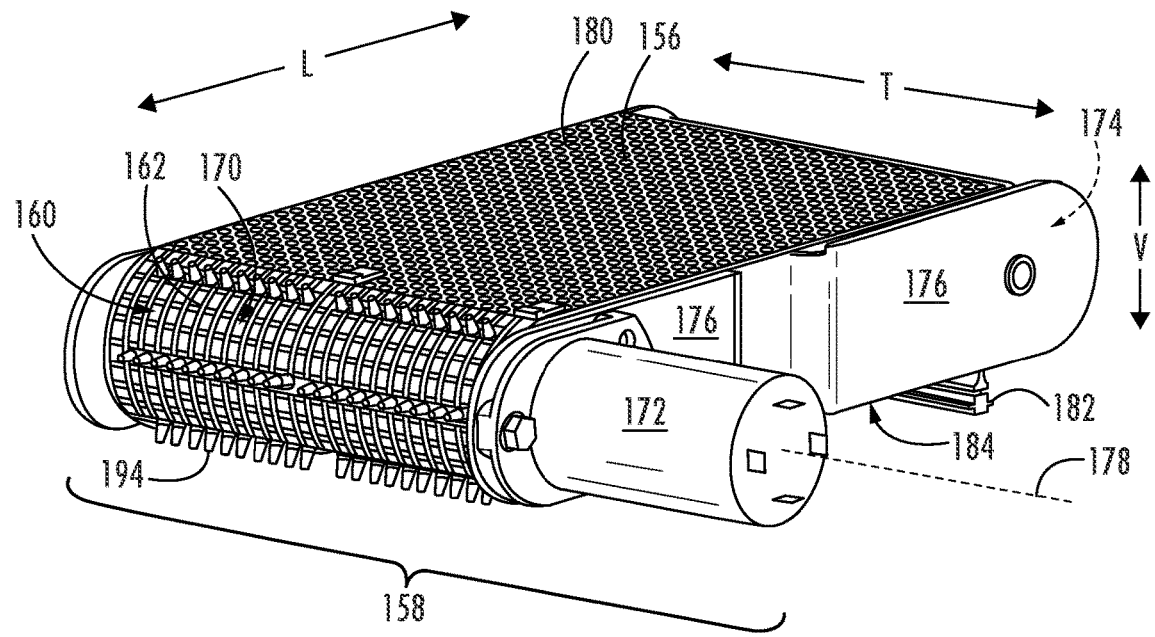
FIG. 3 provides a perspective view of the exemplary solids separator of FIG. 1 with the housing removed to reveal a belt drive mechanism according to example embodiments of the present subject matter.
Figure 4:
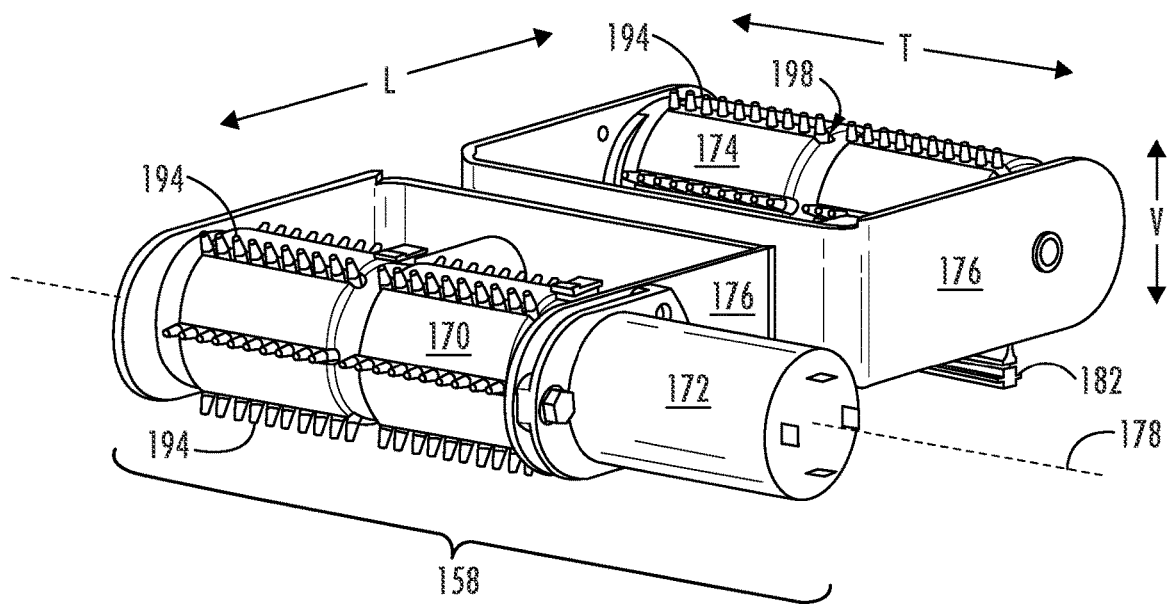
FIG. 4 provides a perspective view of the exemplary belt drive mechanism of FIG. 3 with the screen mesh belt removed according to example embodiments of the present subject matter.
Figure 5:
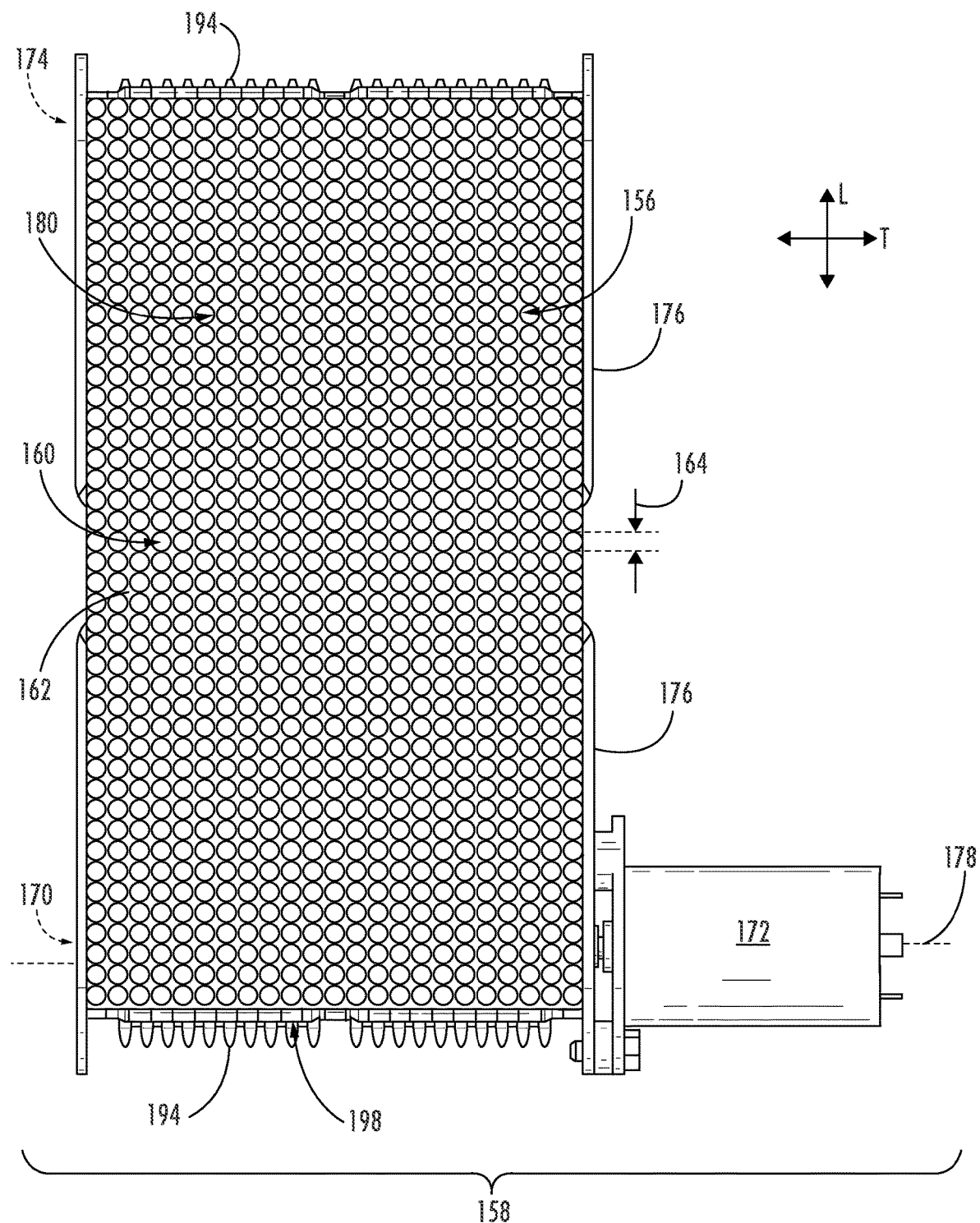
FIG. 5 provides a top view of the exemplary belt drive mechanism of FIG. 3 according to example embodiments of the present subject matter.
Figure 6:
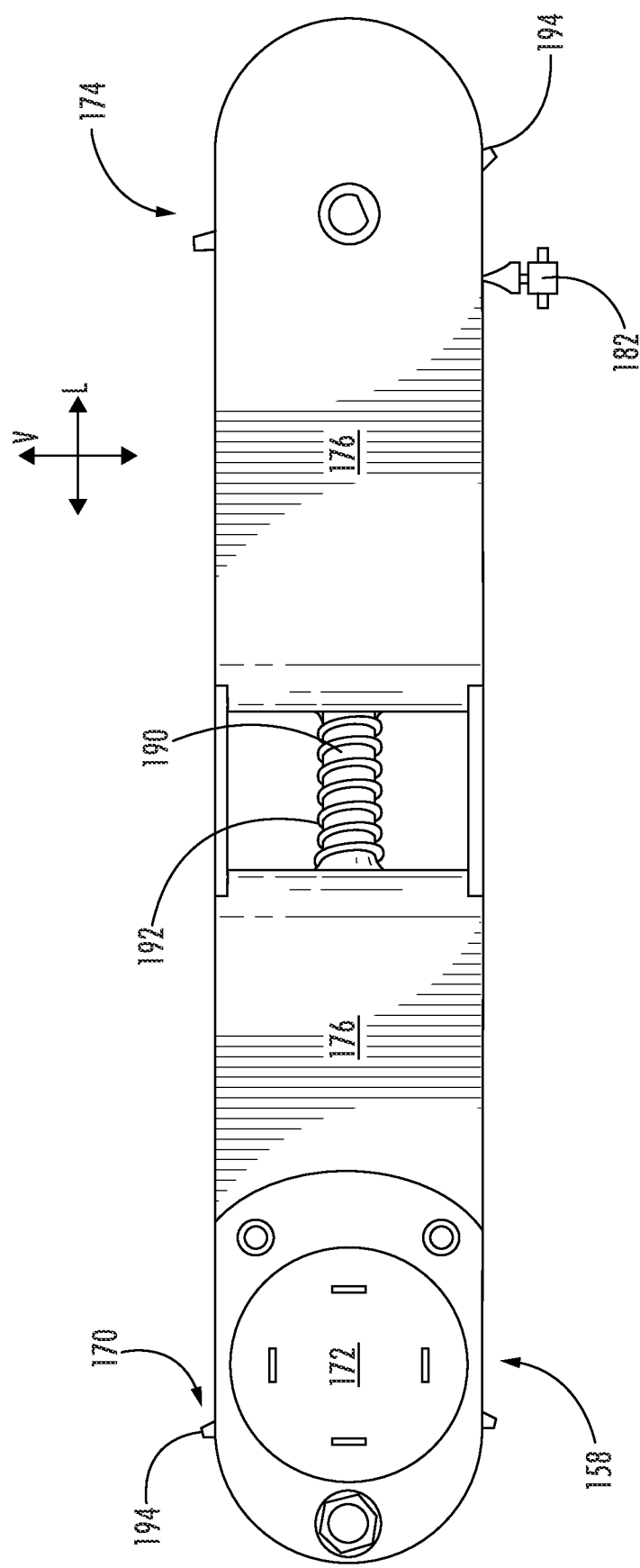
FIG. 6 provides a side view of the exemplary belt drive mechanism of FIG. 3 according to example embodiments of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Turning to the figures, FIG. 1 provides a perspective view composting system 100 according to an exemplary embodiment of the present disclosure. As explained in more detail below, composting system 100 may be used in any residential, commercial, or other setting for improving the disposal of liquid and food waste. More specifically, the composting system 100 described herein provides for environmentally friendly waste disposal and reuse with reduced production of the most harmful greenhouse gases, e.g., such as methane. Moreover, byproducts of food waste may be used for secondary beneficial purposes, such as being used as fertilizer, mulch, or other organic planting material.

Specifically, as shown schematically in FIG. 1, composting system 100 generally includes a waste disposal source, such as a sink drain 102. In general, sink drain 102 may be configured for receiving a stream of waste (e.g., as identified generally by reference numeral 104 in FIG. 1). In this regard, for example, sink drain 102 may be a kitchen sink in a residential setting. Instead of placing waste food into a trash bin for disposal in a landfill, consumers may use composting system 100 to dispose of such waste in a more environmentally friendly manner. In this regard, stream of waste 104 may be deposited directly into sink drain 102. In general, stream of waste 104 may include any suitable liquids, solids, or other food waste that is suitable for use in the composting process or which may otherwise be routed to an external drain, as described in more detail below.

As shown, composting system 100 further includes a disposer 106 which is generally configured for chopping, crushing, macerating, or otherwise breaking down stream of waste 104 into more manageable food particles and waste. For example, if a user places an entire banana within sink drain 102, disposer 106 may chop up the banana such that the fibrous banana peel does not clog components downstream of disposer 106. It should be appreciated that disposer 106 may have any suitable system of blades or other crushing components to break down stream of waste 104 into any suitable particle size. In addition, it should be appreciated that disposer 106 may be supplied with any necessary stream of water or other liquid to facilitate the grinding, chopping, or decomposition process.

Composting system 100 may further include a P-trap 108 that is positioned downstream of sink drain 102 and/or disposer 106. In general, P-trap 108 is a plumbing conduit that is shaped in a form of the letter "P" through which stream of waste 104 is passed. In general, P-trap 108 includes a U-shaped portion of pipe designed to trap liquid to prevent unwanted flow of gases, e.g., back through sink drain 102. In this manner, once the stream of waste 104 passes through P-trap 108, a portion of liquid may remain in the U-shaped portion of P-trap 108 to prevent undesirable fumes from seeping upstream through sink drain 102. Although a P-trap 108 is illustrated, it should be appreciated that any other suitable plumbing fixture for preventing the flow of fumes back through sink drain 102 may be used while remaining within the scope of the present subject matter.

Referring still to FIG. 1, composting system 100 may further include a solids separator 110 that is generally configured for receiving the stream of waste 104 and separating the stream of waste 104 into liquid waste (e.g., as identified generally by reference numeral 112) and solid waste (e.g., as identified generally by reference numeral 114). According to exemplary embodiments, liquid waste 112 may be passed to an external drain 116, such as a drain that enters a municipal sewage system or a private septic system. In addition, composting system 100 may include an air handler or fan 118 that is fluidly coupled with composting system 100 for creating a negative pressure within composting system 100 and urging gases and fumes away from sink drain 102. Specifically, according to the illustrated embodiment, fan 118 would be fluidly coupled to composting system 100 high in the system, e.g., at an upstream location. For example, fan 118 may be coupled to housing 130 (described below) of solids separator 110, e.g., as shown schematically in FIG. 1. Alternatively, fan 118 may be coupled to P-trap 108, to external drain 116, or any other suitable outlet configured to receive liquid waste 112. In this manner, fan 118 may be periodically or continuously operate to generate a negative pressure and prevent undesirable fumes from exiting composting system 100, e.g., through sink drain 102. Although an axial fan 118 is illustrated, it should be appreciated any suitable type of air handler, fan, or air blower may be used while remaining within the scope of the present subject matter. In addition, as illustrated schematically in FIG. 1, composting system 100 may further include a second P-trap 108 fluidly coupled downstream of solids separator 110 and immediately upstream or downstream of external drain 116.

Referring still to FIG. 1, solid waste 114 may be passed from solids separator 110 into a composting bin 120 to facilitate a composting process. In this regard, composting bin 120 may be any suitable container that defines a mixing chamber 122 for receiving solid waste 114. As shown, a mixing device 124, such as a rotary vane agitator, may be rotatably mounted within mixing chamber 122 for agitating, churning, or otherwise mixing the contents within mixing chamber 122. According to exemplary embodiments, composting system 100 may include further features for adding materials to facilitate the composting process, such as enzymes, heat, other organic material, or any other suitable material. In this regard, composting bin 120 may further include a heating assembly (not shown) for heating mixing chamber 122 to facilitate the composting process. Notably, this process generates valuable fertilizer or soil amendment while minimizing the generation of methane gas that would otherwise be generated by stream of waste 104 if deposited in a landfill.

Referring now also to FIGS. 2 through 9, solids separator 110 will be described in more detail according to an exemplary embodiment of the present subject matter. In general, solids separator 110 includes a housing 130 that generally defines a vertical direction V, a lateral direction L, and a transverse direction T, each of which is mutually perpendicular, such that an orthogonal coordinate system is generally defined. Specifically, housing 130 may extend along the vertical direction V between a top side 132 and a bottom side 134, along the lateral direction L between a first side 136 and a second side 138, and along the traverse direction T between a front portion 140 and a rear portion 142.

As shown, housing 130 generally includes a waste inlet 144 that is defined proximate top side 132 of housing 130 for receiving stream of waste 104 from P-trap 108. As noted above and described in more detail below, solids separator 110 is generally configured for separating stream of waste 104 into liquid waste 112 and solid waste 114. Thus, housing 130 further defines a liquids outlet 146 through which liquid waste 112 may pass to external drain 116. In addition, housing 130 defines a solids outlet 148 through which solid waste 114 may pass to composting bin 120. According to an exemplary embodiment, fan 118 may be directly coupled to liquids outlet 146. Although an exemplary design of housing 130 and positioning of inlets and outlets is described herein, it should be appreciated that variations and modifications may be made to the construction of solids separator 110 while remaining within the scope of the present subject matter.

According to exemplary embodiments, the solids separation process relies at least in part on gravity. Thus, as illustrated, waste inlet 144 may be defined in top side 132 of housing 130, while both liquids outlet 146 and solids outlet 148 may be defined in bottom side 134 of housing 130. Moreover, according to the illustrated embodiment, waste inlet 144 is positioned over liquids outlet 146 along the vertical direction V, e.g., proximate first side 136 of housing 130. By contrast, solids outlet 148 may be positioned at an opposite side, e.g., second side 138, of housing 130. Moreover, to facilitate draining of liquid waste 112 toward liquids outlet 146, bottom side 134 of housing 130 may define a sloped bottom wall 150 that extends at least partially between liquids outlet 146 and solids outlet 148, and which is angled downward toward liquids outlet 146. As result, as solid waste 114 is transported from first side 136 toward second side 138, liquid waste 112 may drain from solid waste 114, may be collected by the sloped bottom wall 150 and may be routed toward liquids outlet 146.

Referring now still to FIGS. 2 through 9, a mechanism for separating stream of waste 104 into liquid waste 112 and solid waste 114 will be described according to an exemplary embodiment of the present subject matter. Specifically, for example, housing 130 is illustrated in phantom in FIG. 2, such that a separator belt 156 and a belt drive mechanism 158 for rotating separator belt 156 is visible. These components will be described in detail below. In general, separator belt 156 is a continuous belt that defines a plurality of apertures 160 through which liquid waste 112 may pass under the force of gravity. As shown, separator belt 156 extends along the lateral direction L between liquids outlet 146 at first side 136 of housing 130 and solids outlet 148 at the opposite second side 138 of housing 130. More specifically, as illustrated, separator belt 156 extends substantially within a horizontal plane, e.g., as defined by the lateral direction L and the transverse direction T. In this manner, separator belt 156 is positioned between waste inlet 144 and liquids outlet 146 along the vertical direction. Thus, as stream of waste 104 flows into housing from waste inlet 144, it may fall onto and through separator belt 156, where solids waste 114 is screened or extracted from liquid waste 112. As separator belt 156 is rotated by drive mechanism 158, solid waste 114 is transported toward and discharged into solids outlet 148. According to still other embodiments, separator belt 156 may be angled relative to the horizontal direction and may transport solid waste 114 to an elevated solids outlet 148, e.g., an outlet not defined in bottom side 134 of housing 130.

Notably, the size of apertures 160 may vary as needed depending on the application, the types of liquid waste 112 and solid waste 114 in the stream of waste 104, the type of disposer 106 and the particle sizes discharged from disposer 106, or based on any other variable. According to exemplary embodiments, separator belt 156 is a screen mesh 162 that defines an average aperture dimension, e.g., such as an average width or diameter 164 (FIG. 5) of between about 2 and 20 mm, between about 3 and 10 mm, between about 4 and 7 mm, or about 5 mm. In addition, separator belt 156 may be formed from any suitable material. According to exemplary embodiments, separator belt 156 is formed from silicon or Teflon-coated fiberglass. However, other suitably rigid and nonstick mesh screens are possible and within the scope of the present subject matter.

Notably, drive mechanism 158 generally includes a drive cylinder 170, a drive motor 172 that is mechanically coupled to drive cylinder 170, and a tensioning cylinder 174 that is configured for maintaining tension on separator belt 156, e.g., to prevent slacking under the weight of solid waste 114. Each of these components will be described below according to an exemplary embodiment of the present subject matter. In general, drive cylinder 170 and tensioning cylinder 172 may each be positioned in a separate cylinder housing 176 that rotatably supports each cylinder 170, 174 such that they may rotate about axis of rotation 178 that is parallel to the transverse direction T. In addition, drive motor 172 is directly coupled to drive cylinder 170 and also rotates about axis of rotation 178.

As used herein, "motor" may refer to any suitable drive motor and/or transmission assembly for rotating the drive cylinder 170. For example, drive motor 172 may be a brushless DC electric motor, a stepper motor, or any other suitable type or configuration of motor. For example, drive motor 172 may be an AC motor, an induction motor, a permanent magnet synchronous motor, or any other suitable type of AC motor. In addition, drive motor 172 may include any suitable transmission assemblies, clutch mechanisms, or other components. According to an exemplary embodiment, drive motor 172 may be operably coupled to a controller (not shown), which is programmed to rotate drive cylinder 170 according to predetermined operating cycles, e.g., such as any time disposer 106 is operating.

In this manner, drive motor 172 may rotate separator belt 156 such that a top surface 180 of separator belt 156 is moved substantially along the lateral direction L from liquids outlet 146 toward solids outlet 148. As separator belt 156 wraps around tensioning cylinder 174, solid waste 114 may be discharged into solids outlet 148. According to the illustrated embodiment, solid separator 110 may further include a wiper arm 182 that is positioned adjacent to and in contact with a bottom surface 184 of separator belt 156, e.g., just after it wraps around tensioning cylinder 174. Wiper arm 182 may be a rigid or resilient member that extends along the transverse direction T and is biased against bottom surface 184 to scrape the rotating separator belt 156. In this manner, as bottom surface 184 of separator belt 156 moves back toward liquids outlet 146, wiper arm 182 may dislodge or knock free any stuck solid waste 114 which may then fall directly into solids outlet 148.

As noted above, tensioning cylinder 174 may be rotatably mounted in housing 130 and may be spaced apart from drive cylinder 170 for supporting or tensioning separator belt 156. Specifically, as best shown in FIGS. 3 through 6, cylinder housing 176 that supports drive cylinder 170 and cylinder housing 176 that supports tensioning cylinder 174 may be slidably connected to each other through one or more shafts 190 that extends along the lateral direction L. In addition, a resilient element, such as a mechanical spring 192 may be coiled around each shaft 190 for urging the cylinder housings 176 away from each other along the lateral direction L. In this manner, suitable tension may always be maintained on separator belt 156.

Figure 7:
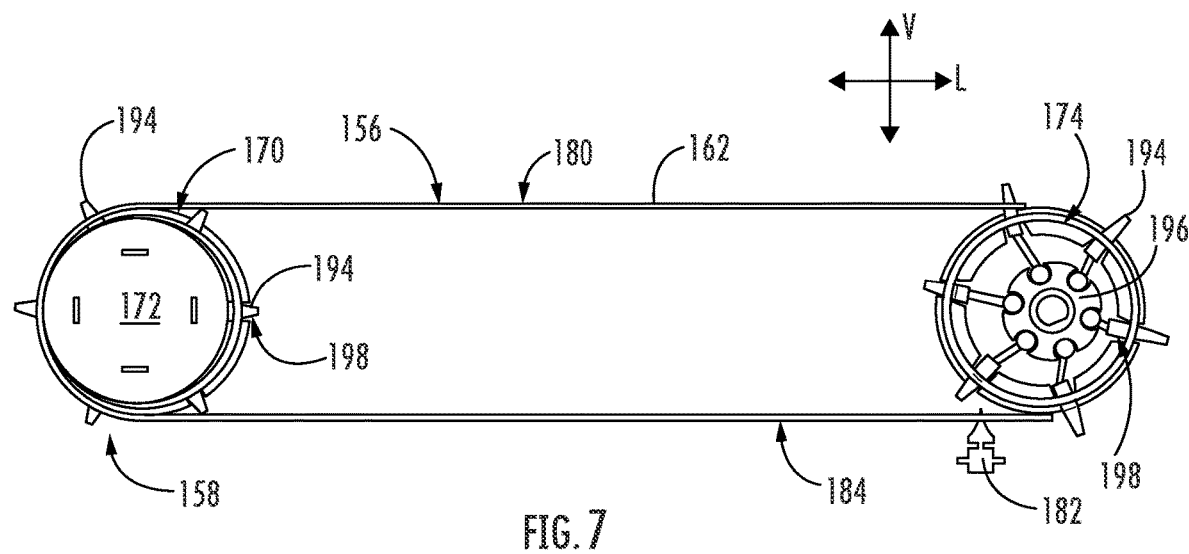
FIG. 7 provides a side view of the exemplary belt drive mechanism of FIG. 3 with certain components removed to illustrate a drive pulley and a tensioning pulley according to example embodiments of the present subject matter.
Figure 8:
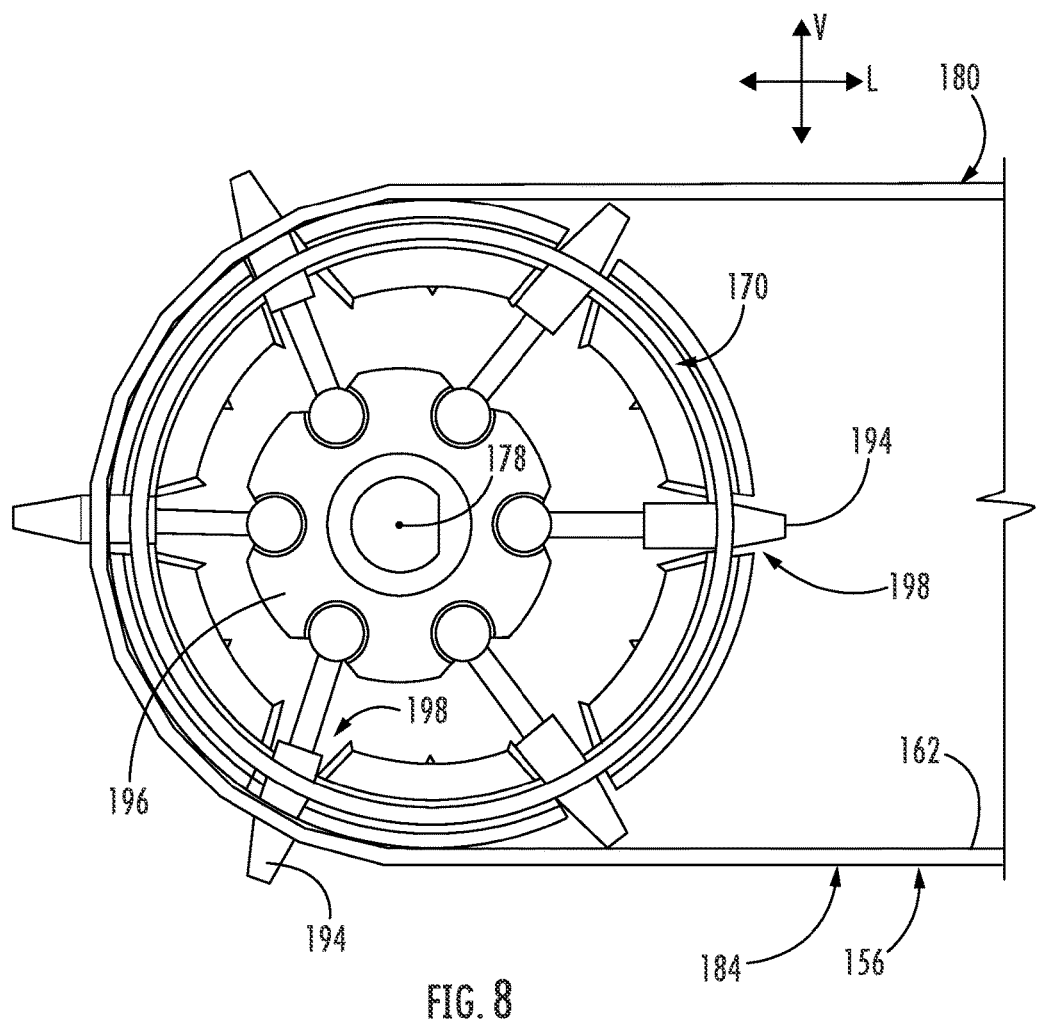
FIG. 8 provides a side view of the exemplary drive pulley of FIG. 7 according to example embodiments of the present subject matter.
Figure 9:
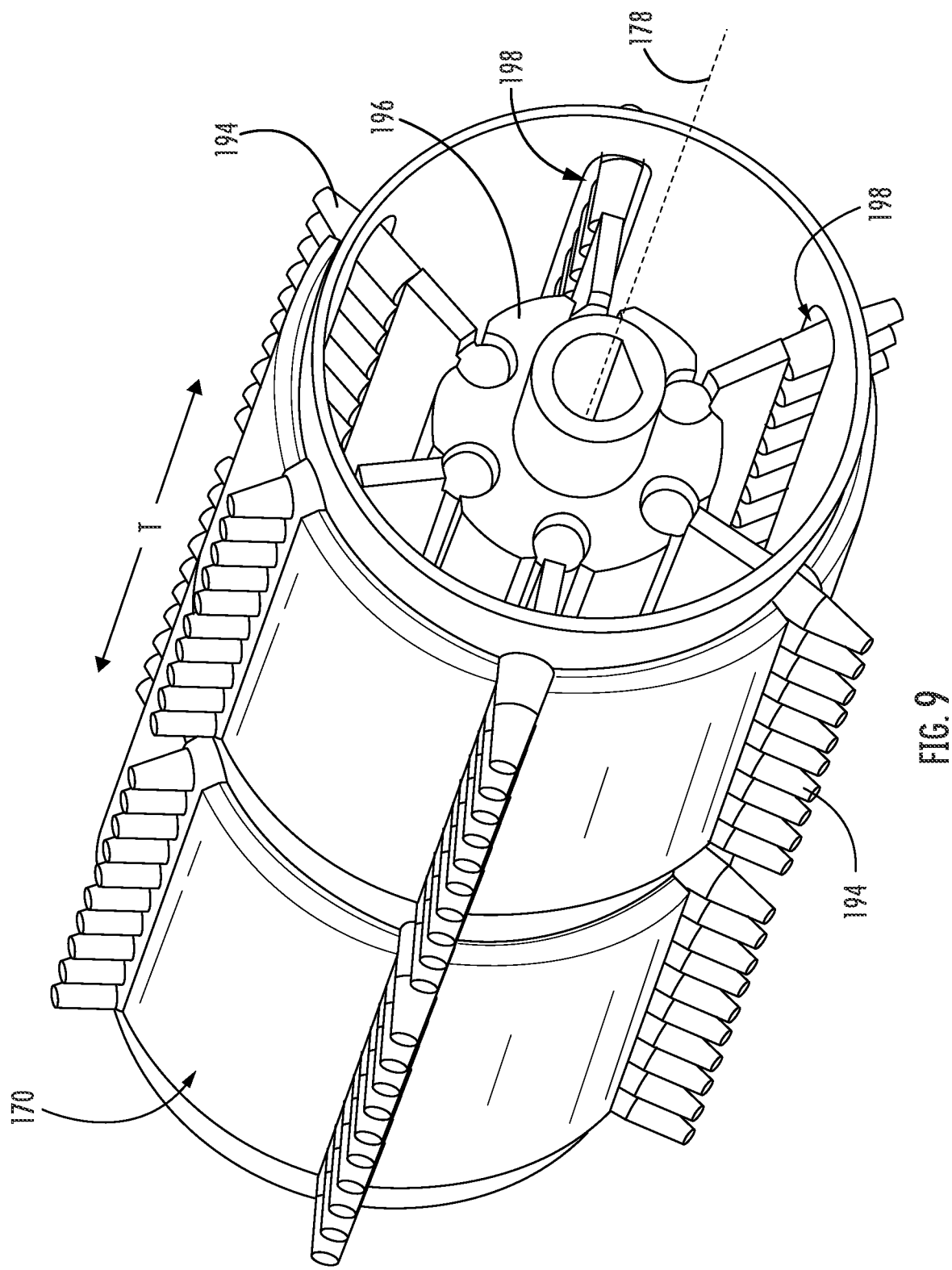
FIG. 9 provides a perspective view of the exemplary drive pulley of FIG. 7 according to example embodiments of the present subject matter.

According to exemplary embodiments, and as best shown in FIGS. 7 through 9, drive cylinder 170 and/or tensioning cylinder 174 may define additional features for driving separator belt 156 and/or cleaning separator belt 156, e.g., by pushing solid waste 114 out of apertures 160. Such features are described below as being used with drive cylinder 170. However, it should be appreciated that these mechanisms may be used with one or both of drive cylinder 170 and tensioning cylinder 174. Specifically, as illustrated, drive cylinder 170 may include a plurality of cleaning pins 194 that are mounted to a central hub 196 and are slidably received within cylinder apertures 198 defined on an outer surface of drive cylinder 170.

Notably, central hub 196 has an offset axis of rotation (e.g., axis of rotations 178) relative to an axis of rotation of drive cylinder 170. As such, as drive central hub 196 is rotated, cylinder 170 also rotates, but cleaning pins 194 are urged to slide back and forth through cylinder apertures 198 and through apertures 160 of separator belt 156 to discharge any lodged solid waste 114. Specifically, central hub 196 and cleaning pins 194 may be configured for moving between an extended position when cleaning pins 194 are pointing toward first side 136 of housing 130 and into a retracted position when cleaning pins 194 are pointing toward second side 138 of housing 130. In this regard, for example, a drive shaft of drive motor 172 may be directly coupled to central hub 196. As central hub 196 rotates under force of the motor, cleaning pins 194 may engage drive cylinder 170 to rotate drive cylinder 170 while also extending and retracting substantially along a radial direction defined perpendicular to the axis of rotation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A solids separator for separating solid waste from liquid waste in a stream of waste, the solids separator comprising:
   a housing defining a waste inlet for receiving the stream of waste, a liquids outlet for passing the liquid waste, and a solids outlet for passing the solid waste;
   a separator belt positioned within the housing and extending between the liquids outlet and the solids outlet, the separator belt defining a plurality of apertures through which the liquid waste passes through the separator belt and into the liquids outlet;
   a drive cylinder rotatably mounted within the housing and being selectively rotated to drive the separator belt such that a top surface of the belt is moved toward the solids outlet along with the solid waste that is extracted from the stream of waste; and
   a plurality of cleaning pins that are mounted on at least one of the drive cylinder and the tensioning cylinder, the plurality of cleaning pins extending through the plurality of apertures in the separator belt to clean the separator belt.

2. The solids separator of claim 1, wherein the waste inlet is defined on a top of the housing, and wherein the liquids outlet and the solids outlet are defined on a bottom of the housing.

3. The solids separator of claim 1, wherein the housing extends between a first end portion and a second end portion, the waste inlet and the liquids outlet are defined proximate the first end portion, and the solids outlet is defined proximate the second end portion.

4. The solids separator of claim 1, wherein the housing defines a sloped bottom wall that extends at least partially between the liquids outlet and the solids outlet, the sloped bottom wall being angled downward toward the liquids outlet.

5. The solids separator of claim 1, further comprising:
   a tensioning cylinder rotatably mounted in the housing and being spaced apart from the drive cylinder for supporting the separator belt proximate the solids outlet.

6. The solids separator of claim 5, wherein the tensioning cylinder is slidably mounted relative drive cylinder, the solids separator further comprising:
   a mechanical spring positioned between the tensioning cylinder and the drive cylinder for urging the tensioning cylinder away from the drive cylinder and tensioning the separator belt.

7. The solids separator of claim 1, wherein the plurality of cleaning pins is slidably mounted within the drive cylinder and are mounted to an offset central hub such that the plurality of cleaning pins move between a retracted position and an extended position as the drive cylinder rotates.

8. The solids separator of claim 1, wherein the separator belt extends substantially along a lateral direction between the liquids outlet and the solids outlet.

9. The solids separator of claim 1, wherein the separator belt comprises a screen mesh.

10. The solids separator of claim 1, wherein the plurality of apertures in the separator belt have an average width of between about 3 millimeters and 10 millimeters.

11. The solids separator of claim 1, wherein the separator belt is formed from silicon or Teflon-coated fiberglass.

12. The solids separator of claim 1, further comprising:
    a wiper arm positioned adjacent to and in contact with a bottom surface of the separator belt for wiping a portion of the separator belt, the wiper arm being positioned over the solids outlet along a vertical direction.

13. The solids separator of claim 1, further comprising:
    a fan fluidly coupled to the housing for urging a flow of air out of the housing and through an external drain.

14. The solids separator of claim 13, wherein the fan is fluidly coupled to the liquids outlet.

15. A composting system for separating solid waste from liquid waste in a stream of waste passing through a sink drain, the composting system comprising:
- a P-trap fluidly coupled to the sink drain downstream of the sink drain;
- a solids separator fluidly coupled to the P-trap downstream of the P-trap, the solids separator defining a liquids outlet for passing the liquid waste and a solids outlet for passing the solid waste; and
- a composting bin fluidly coupled to the solids outlet, the composting bin defining a mixing chamber for receiving the solid waste, wherein the solids separator comprises:
  - a housing defining a waste inlet for receiving the stream of waste, the liquids outlet for passing the liquid waste, and the solids outlet for passing the solid waste;
  - a separator belt positioned within the housing and extending between the liquids outlet and the solids outlet, the separator belt defining a plurality of apertures through which the liquid waste passes through the separator belt and into the liquids outlet;
  - a drive cylinder rotatably mounted within the housing and being selectively rotated to drive the separator belt such that a top surface of the belt is moved toward the solids outlet along with the solid waste that is extracted from the stream of waste; and
  - a plurality of cleaning pins that are mounted on at least one of the drive cylinder and the tensioning cylinder, the plurality of cleaning pins extending through the plurality of apertures in the separator belt to clean the separator belt.

16. The composting system of claim 15, wherein the liquids outlet is fluidly coupled to an external drain, the composting system further comprising:
- a fan fluidly coupled to the liquids outlet for urging a flow of air through the external drain.

17. The composting system of claim 15, further comprising:
- a mixing device positioned in the mixing chamber for mixing the solid waste.

18. The composting system of claim 15, further comprising:
- a disposer operably coupled to the sink drain for chopping or grinding the stream of waste before passing the stream of waste through the P-trap.

19. A solids separator for separating solid waste from liquid waste in a stream of waste, the solids separator comprising:
- a housing defining a waste inlet for receiving the stream of waste, a liquids outlet for passing the liquid waste, and a solids outlet for passing the solid waste;
- a separator belt positioned within the housing and extending between the liquids outlet and the solids outlet, the separator belt defining a plurality of apertures through which the liquid waste passes through the separator belt and into the liquids outlet;
- a drive cylinder rotatably mounted within the housing and being selectively rotated to drive the separator belt such that a top surface of the belt is moved toward the solids outlet along with the solid waste that is extracted from the stream of waste; and
- a wiper arm positioned adjacent to and in contact with a bottom surface of the separator belt, the wiper arm being configured to remove the solid waste from the separator belt.

20. The solids separator of claim 19, further comprising:
- a plurality of cleaning pins that are mounted on at least one of the drive cylinder and the tensioning cylinder, the plurality of cleaning pins extending through the plurality of apertures in the separator belt to clean the separator belt.

* * * * *